United States Patent
Funk

(10) Patent No.: US 6,650,997 B2
(45) Date of Patent: Nov. 18, 2003

(54) SYSTEM AND METHOD FOR INTERFACING MOBILE UNITS USING A CELLPHONE

(75) Inventor: Karsten Funk, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/967,729

(22) Filed: Sep. 28, 2001

(65) Prior Publication Data

US 2003/0065441 A1 Apr. 3, 2003

(51) Int. Cl.$^7$ ................................ H04Q 7/20
(52) U.S. Cl. .................. 701/207; 701/208; 701/209; 701/213; 342/357.1
(58) Field of Search ................ 701/207, 208, 701/209, 213, 210, 211, 212, 201, 200; 342/357.1, 357.08, 357.12, 357.01; 455/456

(56) References Cited

U.S. PATENT DOCUMENTS 6,393,292 B1 * 5/2002 Lin ........................... 455/456
6,438,382 B1 * 8/2002 Boesch et al. ............ 342/357.1

* cited by examiner

Primary Examiner—Richard M. Camby
(74) Attorney, Agent, or Firm—Kenyon & Kenyon

(57) ABSTRACT

A system for converting a voice input requested location to a destination location useable by a navigation device in a vehicle. The system includes a mobile communicator, preferably a mobile phone, in communication with a base station and a voice portal server. The voice portal server identifies through a voice recognition algorithm a destination location corresponding to a requested location verbally input by the vehicle occupant. The voice portal server may access the internet for additional information. The voice portal server may prompt the occupant to respond to interrogatories to narrow the possible matches for the requested location to one destination location. The destination location is transmitted from the voice portal server via the base station and via the mobile communicator to a decoder in an encoded format, preferably in DTMF (Dual Tone Multi-Frequency) format. The decoder decoding the destination location and transmitting the destination location to a navigation device. The navigation device plotting a selected route from the current location to the destination location. A method of using the system is provided. An in-vehicle apparatus using the system is also provided.

45 Claims, 2 Drawing Sheets

SYSTEM AND METHOD FOR INTERFACING MOBILE UNITS USING A CELLPHONE

FIELD OF THE INVENTION

The present invention relates to a navigation system, and more specifically, to a navigation system for a vehicle using a voice portal server to aid in the identification of a destination location.

BACKGROUND INFORMATION

Navigation systems for both personal use and vehicle use are proliferating. These navigation systems may use any number of possible positioning methods. Especially important in the development of portable navigation systems is the reduction in size and cost of systems using GPS (Global Positioning System). GPS uses satellites in low-earth orbit to position the user on the earth's surface. DGPS (Differential Global Position System) is a method of improving the position solution of GPS by correcting the pseudoranges received by a GPS receiver using fixed stations in the vicinity of the GPS receiver. AGPS (Assisted Global Positioning System) is a method of incorporating a mobile communicator into the GPS system and using the communicator to outsource all, or a portion, of the position computation to a remote processing center, and thereby reduce the computing power incorporated in the mobile GPS receiver. AGPS can also incorporate the improved position solution possible with DGPS at a lower cost by correcting the pseudoranges of the AGPS receiver at the remote processing center. Cell-phone based positioning systems may use variations of traditional triangulation methods, cell identification, and intersections of hyperbolic solutions of time-delays at either base stations or dedicated mobile phone positioning stations. Combinations of any of the above-mentioned systems are also possible.

Most navigation devices require, in addition to the current position that is calculated by the positioning system (e.g. GPS), a destination, and possibly a collection of possible routes (e.g. streets, roads, and highways). Therefore, most navigation devices require a destination to be input into the device. Various types of data input devices have been used in different situations. Some exemplary data input devices include keypad inputs, touchscreen inputs, and voice inputs. However, each of these types of inputs suffers from some drawback in an implementation in a personal, mobile navigation device. For instance, keypad units are time-consuming and attention-diverting, making them inappropriate for vehicle navigation because the driver is often the person inputting the information, and the vehicle is often in motion when the driver wants to access the navigation device. Touchscreen inputs also divert attention from the driving process, and though they may be more time-efficient than keypad entry, they often require more computing power and more expensive components (e.g. a touch-sensitive screen) than a simple keypad entry system. Voice input has a tremendous advantage in that it diverts little, if any, of the driver's attention from the driving act. However this advantage is counter-balanced by the fact that voice-recognition software is complex and expensive, and requires a relatively large amount of computing power to implement.

The goal of the present invention is to provide a system that implements a voice input system for a mobile navigation device without the additional cost of incorporating a voice-recognition system into the mobile navigation device.

SUMMARY OF THE INVENTION

A system is provided for navigating a user. The system includes a mobile communicator, a decoder, a navigation device, a base station, and a voice portal server. The voice portal server allows remote identification of a destination location from a requested destination through voice recognition and other means, and then communicates the identified destination location to the mobile navigation device over the mobile communicator, for instance over the voice channel of a mobile phone. The mobile navigation device is then able to assist the driver in navigating from the current position to the destination location, without the driver having to divert attention away from driving to input the destination location into the navigation device. Additionally, the present invention implements the voice data input system for the destination address without the addition to the navigation device of the substantial computing power associated with a stand-alone voice recognition system.

The present invention also provides a method for a vehicle occupant to obtain navigation information using the system of the present invention. The method provides for the occupant to communicate via the mobile communicator and the base station to the voice portal server a requested location. The voice portal server communicates in turn via the base station and the mobile communicator to the decoder a coded destination location. The coded destination location corresponds to an encoded version of the destination location and is decoded by the decoder to determine the destination location. This destination location is then communicated to the navigation device.

A vehicle navigation apparatus is additionally provided which includes a mobile communicator, a decoder, and a vehicle navigation device, all of which are situated in the vehicle. This navigation apparatus communicates via the mobile phone and a base station to a voice portal server. The voice portal server operates in a similar fashion to the system described above to receive and recognize a requested location and communicate back to the apparatus via the base station and the mobile communicator a destination location.

DETAILED DESCRIPTION

Figure 1:
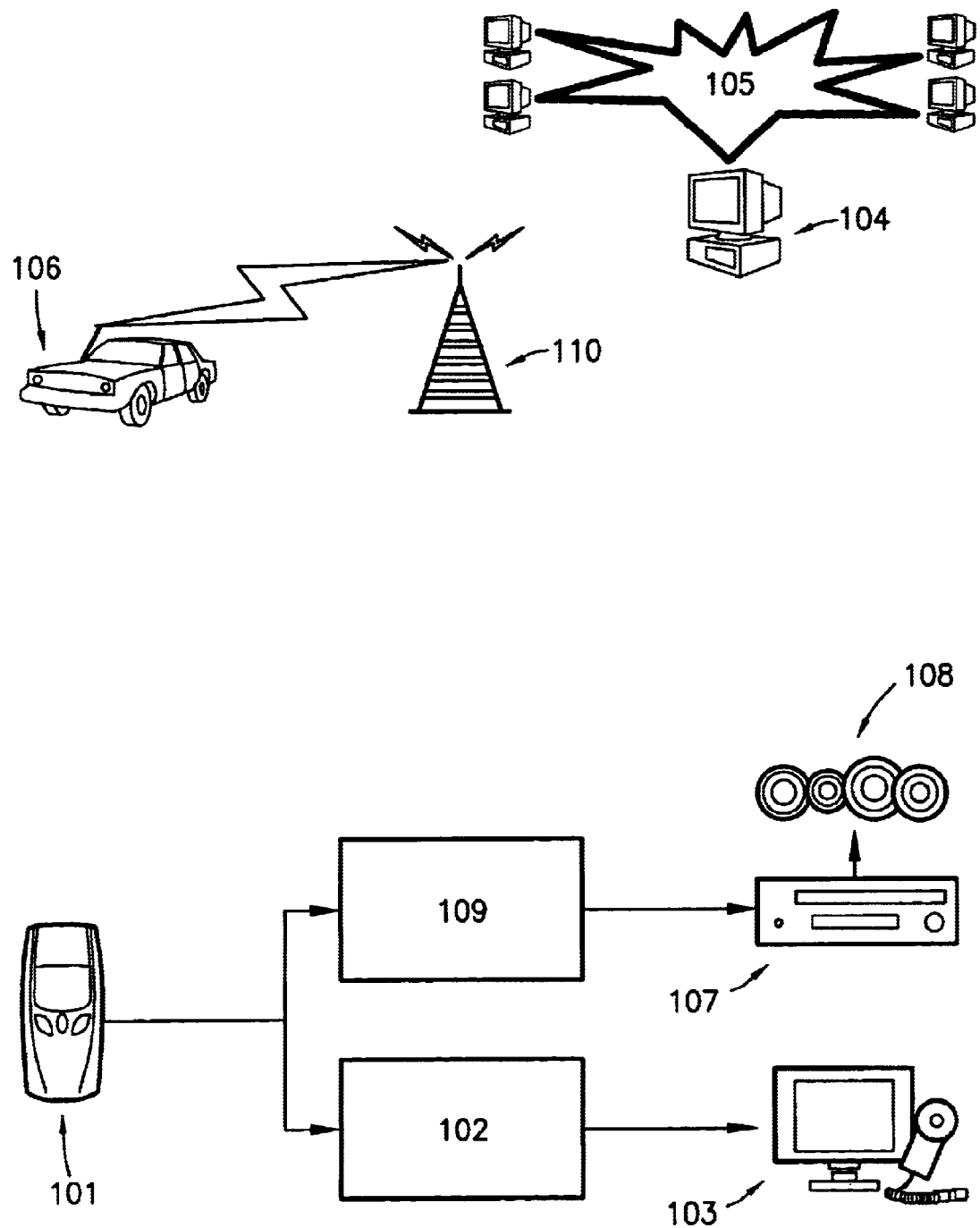
FIG. 1 is a schematic representation of a first embodiment of the navigation system of the present invention.

Referring to FIG. 1, the system according to the present invention includes a mobile communicator 101, for instance a mobile phone; a decoder 102, for instance a DTMF (Dual Tone Multi-Frequency) decoder; a navigation device 103, for instance a GPS-based receiver; and a voice portal server 104. The voice portal server 104 is accessible from the mobile communicator 101 in the vehicle 106 communicating with a base station 110. The voice portal server 104 is able to access the internet 105 to obtain additional information. The system allows the occupant to request over the mobile phone to a base station 110, and from there to a voice portal server 104, a destination location. The system may provide for the voice portal server 104 to implement a voice recognition algorithm to produce a set of possible matches for the requested destination location.

The system may additionally provide for the voice portal server 104 to reduce the number of requested destinations to one address through any of several possible methods. One method for reducing the number of matches may be to audibly prompt the occupant with each possible match until an affirmative response is registered. Alternatively, the system may prompt the occupant with questions that distinguish between sub-categories of the set of possible matches. These questions might be designed by the voice portal server 104 to reduce the number of possible matches as efficiently as possible to a smaller set of possible matches, or potentially to one possible match. A third alternative may be for the voice portal server 104 to prompt the mobile navigation device 103 to provide a current location for the vehicle 106, and then for the voice portal server 104 to limit the possible matches to those destination locations within a predetermined maximum distance from the current location. There might also be an override of this function to allow navigation assistance for longer drives. Some combination of these three possible methods for reducing the possible destination location matches might also be possible.

After determining the destination location, the voice portal server 104 might communicate this information directly to the mobile navigation device 103, using the mobile communicator 101. Using the destination address received from the voice portal server 104, the mobile navigation device 103 might calculate a route from the current position to the destination based on an algorithm that might include factors including a set of roads in a database, road construction, traffic conditions, weather conditions, and driver preferences.

The navigation device 103 might provide navigational direction from the current location to the requested destination location to the occupant by any of several possible means, including but not limited to, a visual display unit, a heads-up display, and a series of audible directions. When audible directions are provided, the navigation device 103 would provide a series of directions from a current location to the requested destination along a selected route. Each direction would be delivered audibly at a time that would enable the occupant to act on the navigational direction.

In an exemplary embodiment, the navigation device 103 provides the navigational direction audibly through a vehicle sound system 107 with speakers 108 or a dedicated speaker. The navigational direction is delivered to the occupant at a time before the occupant needs to act on the navigational direction. The timing of the delivery of the navigational direction is determined by the navigation device 103 and may be based on any of an instantaneous position measurement, an instantaneous heading measurement, an instantaneous velocity measurement, the requested location, and the selected route.

In an exemplary embodiment, the mobile communicator 101 is connected to a speaker 108 and a microphone (not shown) through a hands-free kit 109. In this embodiment the speaker 108 may be part of a vehicle sound system 107 or the speaker may be a dedicated speaker. Alternative exemplary embodiments provide that the mobile communicator 101 may be a mobile telephone or any device capable of communicating wirelessly. The voice portal server 104 connects to the internet 105 to access information from both public and private databases concerning requested locations, traffic, weather, or any other useful information. By outsourcing the voice recognition software and hardware to a voice portal server 104 external to the vehicle 106, the cost of implementing the voice input system is reduced and improved voice recognition systems can be implemented with greater ease. The system of identifying requested locations by the voice portal server 104 and communicating the corresponding destination location from the voice portal server 104 to the navigation device 103 via the mobile communicator 101 and the decoder 102 allows the occupant to input a destination location to the navigation device 103 using voice input only. Voice inputs have the advantages noted above that they do not distract the driver from the driving task, and thereby increase road safety. The navigation device 103 can use any of, or all of, the destination location, a current position, a road/street database, and a route selection algorithm to determine a selected route. The navigation device 103 may use any number of positioning methods to determine the current position and to monitor progress along the selected route. These positioning systems may include GPS, DGPS, AGPS, triangulation, hyperbolic intersection of time-delay solutions, and cell identification to position the user.

The navigation system includes a decoder 102 which in an exemplary embodiment is a DTMF (Dual Tone Multi-Frequency) decoder. Using a DTMF decoder allows communication between the decoder 102 and the voice portal server 104 to proceed along the normal voice channel of the mobile telephone. Use of the voice channel provides a low-cost method of implementing the system according to the present invention. Since the DTMF code is common and well-known, implementation costs are lower and the system is flexible. The transmission of the destination location from the voice portal server 104 to the decoder 102 and subsequently to the vehicle navigation device 103 might occur over the open voice channel and might involve the voice portal server 104 sending a jingle or prompt to the decoder 102. The decoder 102, after recognizing the jingle or prompt, might mute the voice input from the occupant in order to retain the integrity of the coded signal being transmitted by the voice portal server 104. Additionally, the audio output to the driver might be muted when the coded signal is being transmitted to reduce the distraction to the driver of hearing the coded signal being transmitted by the voice portal server 104. A ready-jingle or ready-prompt might be sent by the decoder 102 to the voice portal server 104 to indicate that the muting operation has occurred and that the decoder 102 is ready to receive the coded destination location. Upon receiving the ready-jingle or ready-prompt from the decoder 102, the voice portal server 104 would transmit over the voice channel of the mobile telephone a coded version of the destination location to the onboard decoder 102.

In a similar fashion, the voice portal server 104 might prompt the decoder 102 with a jingle or prompt to indicate a readiness to receive, or a request for, a current location of the vehicle 106. The decoder 102, upon recognizing the jingle or prompt from the voice portal server 104, might mute the occupant input to the voice channel of the mobile telephone, and might also mute the speaker output to the driver, and might thereupon transmit a current location in coded format. The voice portal server 104 might use the current location transmitted by the onboard positioning device 103 to limit the possible matches in the location database for the requested location to those locations within a predetermined maximum distance from the current location of the vehicle 106. This process might simplify the process of identifying a destination location from the transmitted requested location, and thereby reduce the number of interrogatories from the voice portal server 104 to the occupant necessary to identify a unique destination location. Using the current location to limit the possible matches in the location database of the voice portal server 104 might thereby reduce the amount of time necessary for the navigation system 103 to identify a selected route, and thereby reduce the cost of the system by reducing the on-air time as well as increase safety by providing navigational directions to the user at the earliest possible moment and with the least amount of distraction. The feature of limiting the location database matches to those locations within a predetermined distance from the current location of the vehicle 106 might be an optional feature which the driver could alternatively disable to obtain navigational assistance on longer drives.

Figure 2:
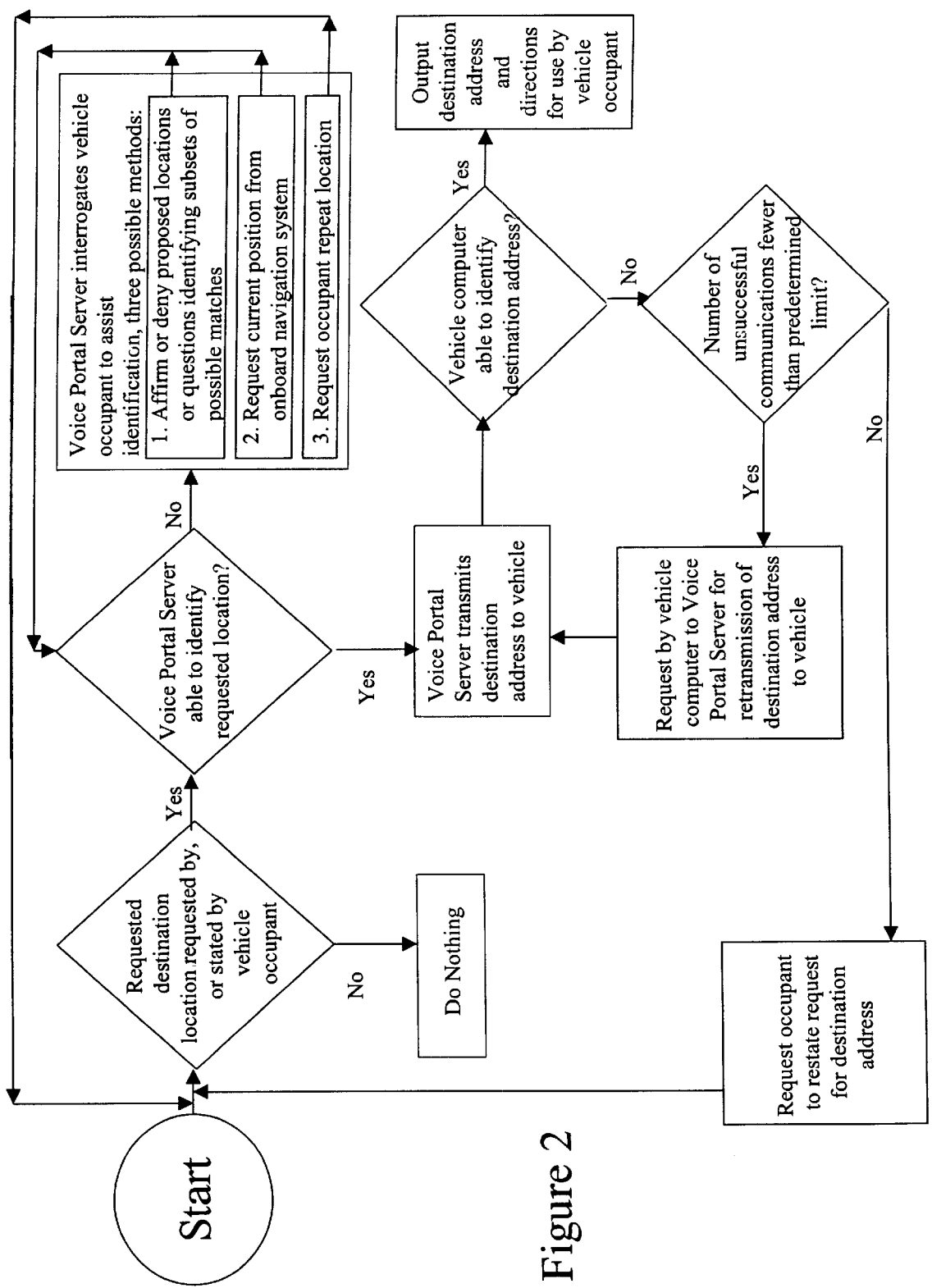
FIG. 2 is a flow chart demonstrating the method according to an embodiment of the navigation system of the present invention.

Referring to FIG. 2, the method according to the present invention is illustrated with a flowchart. A request for a requested destination address originates with an occupant of the vehicle. Absent a request by the occupant, the method is inactive. The request by the occupant is communicated to the voice portal server, which, through voice recognition software, attempts to identify the requested destination address with a specific destination address. If the voice portal server is unsuccessful in identifying the requested destination location, several methods of narrowing the scope of the possible matches to one match are provided. First, the voice portal server may request the occupant to repeat the requested location address. This method is particulary helpful where the original communication is garbled due to poor enunciation on the part of the occupant, a weak wireless signal, or any other temporary and avoidable interference in the communication link. Second, the voice portal server may request a current location from the onboard navigation system in order to reduce the possible matches to those locations within a predetermined distance from the current location of the vehicle. Third, the voice portal server may prompt the occupant to affirm or deny each of a short list of possible matches for the destination location. Alternative methods for reducing the set of possible matches to one possible match are discussed above.

Once the voice portal server has identified the requested location, the voice portal server can communicate a destination address to the onboard computer or navigation system. As noted above, this communication may be in DTMF code, or in any other form useable by the onboard computer or navigation system. After receiving the destination address in a readable format from the voice portal server, the navigation system can compute and communicate a set of directions leading the occupant from a current location to the destination location. In the event, however, that the navigation system is unable to identify the destination location communicated by the voice portal server, the onboard navigation system can either request that the voice portal server retransmit the destination location, or, if a predetermined number of transmissions fails to yield a destination location readable by the onboard navigation system, then the navigation system can request that the occupant start the process over by again requesting a destination location.

Alternatively, the onboard computer could indicate to the voice portal server that the destination location communicated by the voice portal server is unreadable by the onboard navigation system, and request that the voice portal server initiate a reidentification of the requested location in order to determine the destination location.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A navigation system comprising:
   a mobile communicator situated in a vehicle;
   a decoder situated in the vehicle, the decoder able to communicate electronically with the mobile communicator;
   a vehicle navigation device situated in the vehicle, the navigation device able to communicate electronically with the decoder;
   a base station, the base station able to communicate wirelessly with the mobile communicator; and
   a voice portal server, the voice portal server able to communicate electronically with the base station.

2. A navigation system comprising:
   a mobile communicator situated in a vehicle;
   a decoder situated in the vehicle, the decoder able to communicate electronically with the mobile communicator;
   a vehicle navigation device situated in the vehicle, the navigation device able to communicate electronically with the decoder;
   a base station, the base station able to communicate wirelessly with the mobile communicator; and
   a voice portal server, the voice portal server able to communicate electronically with the base station, wherein the voice portal server is external to the vehicle.

3. A navigation system comprising:
   a mobile communicator situated in a vehicle;
   a decoder situated in the vehicle, the decoder able to communicate electronically with the mobile communicator;
   a vehicle navigation device situated in the vehicle, the navigation device able to communicate electronically with the decoder;
   a base station, the base station able to communicate wirelessly with the mobile communicator; and
   a voice portal server, the voice portal server able to communicate electronically with the base station, wherein the voice portal server is able to provide a destination location to the navigation device, the destination location corresponding to a requested location, the requested location is able to be communicated by an occupant of the vehicle to the voice portal server via the mobile communicator.

4. The system of claim 3, wherein:
   the navigation device is able to provide to the voice portal server a current location; and
   the voice portal server is able to use the current location to reduce a number of possible matches for the requested location.

5. A navigation system comprising:
   a mobile communicator situated in a vehicle;
   a decoder situated in the vehicle, the decoder able to communicate electronically with the mobile communicator;
   a vehicle navigation device situated in the vehicle, the navigation device able to communicate electronically with the decoder;
   a base station, the base station able to communicate wirelessly with the mobile communicator; and
   a voice portal server, the voice portal server able to communicate electronically with the base station, wherein the navigation device is able to provide at least one navigational direction to an occupant of the vehicle, the at least one navigational direction able to direct the occupant from a current location to a destination location along a selected route.

6. The system of claim 5, wherein the navigation device is able to provide the at least one navigational direction through a visual display unit.

7. The system of claim 5, wherein:

the navigation device is able to provide the at least one navigational direction through at least one of a vehicle sound system and a dedicated speaker;

the at least one navigational direction is able to be delivered to the occupant at a time before the occupant needs to act on the at least one navigational direction; and a timing of a delivery of the at least one navigational direction is able to be determined by the navigation device based on at least one of an instantaneous position measurement, an instantaneous heading measurement, an instantaneous velocity measurement, the destination location, and the selected route.

8. A navigation system comprising:

a mobile communicator situated in a vehicle;

a decoder situated in the vehicle, the decoder able to communicate electronically with the mobile communicator;

a vehicle navigation device situated in the vehicle, the navigation device able to communicate electronically with the decoder;

a base station, the base station able to communicate wirelessly with the mobile communicator;

a voice portal server, the voice portal server able to communicate electronically with the base station;

a speaker, the speaker able to communicate electronically with the mobile communicator, the speaker able to create sound pressure waves that correspond to prompts from the voice portal server to an occupant of the vehicle; and a microphone, the microphone able to communicate electronically with the mobile communicator, the microphone able to sense sound pressure waves that correspond to responses from the occupant to the voice portal server.

9. The system of claim 8, further comprising:

a hands-free kit, the hands-free kit electronically connectable to the mobile communicator, wherein when the mobile communicator is connected to the hands-free kit, the hands-free kit connects the mobile communicator to at least one of the speaker and the microphone.

10. The system of claim 8, wherein the speaker is part of a vehicle sound system.

11. The system of claim 1, wherein the navigation device uses at least one of GPS, DGPS, AGPS, triangulation, hyperbolic intersection of time-delay solutions, and cell identification to position the user.

12. The system of claim 1, wherein the mobile communicator is a mobile telephone.

13. The system of claim 12, wherein the voice portal server is able to communicate to the navigation device via the base station and the mobile telephone over a voice channel.

14. A navigation system comprising:

a mobile communicator situated in a vehicle;

a decoder situated in the vehicle, the decoder able to communicate electronically with the mobile communicator;

a vehicle navigation device situated in the vehicle, the navigation device able to communicate electronically with the decoder;

a base station, the base station able to communicate wirelessly with the mobile communicator; and a voice portal server, the voice portal server able to communicate electronically with the base station;

wherein:

the mobile communicator is a mobile telephone, the voice portal server is able to communicate to the navigation device via the base station and the mobile telephone over a voice channel, and the decoder is a DTMF decoder.

15. The system of claim 14, wherein:

an occupant of the vehicle is able to communicate a requested location via the mobile telephone and the base station to the voice portal server; and the voice portal server is able to recognize the requested location and create a set of at least one possible destination location.

16. The system of claim 15, wherein:

the at least one possible destination location is at least two possible destination locations;

the voice portal server is able to prompt the occupant with at least one interrogatory; and the at least one interrogatory is able to be designed to reduce the set of at least two possible destination locations to a single destination location.

17. The system of claim 16, wherein the voice portal server is able to communicate the destination location in a DTMF encoded format to the decoder via the base station and mobile telephone.

18. The system of claim 17, wherein the decoder is able to decode the destination location and communicate the destination location to the navigation device.

19. The system of claim 18, wherein the navigation device is able to use at least one of the current location, the destination location, and a stored set of possible routes to calculate a selected route and then is able to communicate the selected route to the occupant by at least one of a visual display unit and at least one audible direction.

20. A method of providing navigation information to an occupant of a vehicle, the method comprising:

providing a mobile communicator;

providing a decoder, the decoder communicating electronically with the mobile communicator;

providing a navigation device, the navigation device communicating electronically with the decoder;

providing a base station, the base station communicating wirelessly with the mobile communicator;

providing a voice portal server, the voice portal server communicating electronically with the base station;

communicating by the occupant via the mobile communicator to the base station to the voice portal server a requested location;

communicating by the voice portal server via the base station to the mobile communicator to the decoder a coded destination location, the coded destination location corresponding to an encoded version of a destination location;

decoding by the decoder the coded destination location to determine the destination location; and communicating by the decoder to the navigation device the destination location.

21. The method of claim 20, wherein the communicating by the occupant further comprises:

soliciting by the occupant to the voice portal server for a set of directions to the requested location; and responding by the occupant to at least one interrogatory from the voice portal server, the at least one interrogatory being for reducing a set of at least two destination locations to the destination location, the destination location corresponding to the requested location.

22. The method of claim 20, further comprising:

communicating by the navigation device to the decoder a current location of a vehicle;

encoding the current location by the decoder to create an encoded current location; and communicating by the decoder to the voice portal server via the mobile communicator and the base station the encoded current location.

23. The method of claim 20, wherein the communicating by the voice portal server further comprises:

receiving by the voice portal server a current location of the vehicle from at least one of the navigation device via the decoder and a cell phone-based locating system;

wherein the voice portal server is able to reduce a set of at least two possible destination locations based on proximity of the vehicle to the at least two possible destination locations by eliminating any possible destination location where the distance between any of the at least two possible destination locations and the current location is greater than a predetermined maximum distance.

24. The method of claim 20, further comprising directing the occupant by the navigation device by providing at least one navigational direction to the occupant, the at least one navigational direction able to direct the occupant from a current location to the destination location along a selected route.

25. The method of claim 24, further comprising providing the at least one navigational direction through a visual display unit.

26. The method of claim 24, further comprising:

providing the at least one navigational direction through at least one of a vehicle sound system and a dedicated speaker;

wherein the at least one navigational direction is able to be delivered to the occupant at a time before the occupant needs to act on the at least one navigational direction; and a timing of a delivery of the at least one navigational direction is able to be determined by the navigation device based on an instantaneous position measurement, an instantaneous heading measurement, an instantaneous velocity measurement, the destination location, and the selected route.

27. A vehicle navigation apparatus comprising:

a mobile communicator situated in a vehicle;

a decoder situated in a vehicle, the decoder electrically coupled to communication with the mobile communicator; and a vehicle navigation device situated in the vehicle, the navigation device electrically coupled to the decoder;

wherein the mobile communicator is able to communicate with a base station, the base station able to communicate with a voice portal server.

28. A vehicle navigation apparatus comprising:

a mobile communicator situated in a vehicle;

a decoder situated in a vehicle, the decoder electrically coupled to communication with the mobile communicator; and a vehicle navigation device situated in the vehicle, the navigation device electrically coupled to the decoder, wherein the mobile communicator is able to communicate with a base station, the base station able to communicate with a voice portal server, the voice portal server external to the vehicle.

29. A vehicle navigation apparatus comprising:

a mobile communicator situated in a vehicle;

a decoder situated in a vehicle, the decoder electrically coupled to communication with the mobile communicator; and a vehicle navigation device situated in the vehicle, the navigation device electrically coupled to the decoder;

wherein:

a voice portal server is able to provide a destination location to the navigation device, the destination location corresponding to a requested location, and a requested location is able to be communicated by an occupant of the vehicle to the voice portal server via the mobile communicator.

30. The apparatus of claim 29, wherein:

the navigation device is able to provide to the voice portal server a current location; and the voice portal server is able to use the current location to reduce a number of possible matches for the requested location.

31. A vehicle navigation apparatus comprising:

a mobile communicator situated in a vehicle;

a decoder situated in a vehicle, the decoder electrically coupled to communication with the mobile communicator; and a vehicle navigation device situated in the vehicle, the navigation device electrically coupled to the decoder;

wherein:

the navigation device is able to provide at least one navigational direction to an occupant of the vehicle, and the at least one navigational direction is able to direct the occupant from a current location to a requested location along a selected route.

32. The apparatus of claim 31, wherein the navigation device is able to provide the at least one navigational direction through a visual display unit.

33. The apparatus of claim 31, wherein:

the navigation device is able to provide the at least one navigational direction through at least one of a vehicle sound system and a dedicated speaker:

the at least one navigational direction is able to be delivered to the occupant at a time before the occupant needs to act on the at least one navigational direction;

a timing of a delivery of the at least one navigational direction is able to be determined by the navigation device based on at least one of an instantaneous position measurement, an instantaneous heading measurement, an instantaneous velocity measurement, the destination location, and the selected route.

34. A vehicle navigation apparatus comprising:

a mobile communicator situated in a vehicle;

a decoder situated in a vehicle, the decoder electrically coupled to communication with the mobile communicator;

a vehicle navigation device situated in the vehicle, the navigation device electrically coupled to the decoder;

a speaker, the speaker electrically coupled to the mobile communicator, the speaker creating sound pressure waves that correspond to prompts from the voice portal server to an occupant of the vehicle; and a microphone, the microphone electrically coupled to the mobile communicator, the microphone sensing sound pressure waves that correspond with responses from the occupant to the voice portal server.

35. The apparatus of claim 34, further comprising:
a hands-free kit, the hands-free kit electronically connectable to the mobile communicator, wherein when the mobile communicator is connected to the hands-free kit, the hands-free kit connects the mobile communicator to at least one of the speaker and the microphone.

36. The apparatus of claim 34, wherein the speaker is part of a vehicle sound system.

37. The apparatus of claim 27, wherein the navigation device is able to use at least one of GPS, DGPS, AGPS, triangulation, hyperbolic intersection of time-delay solutions, and cell identification to position the user.

38. The apparatus of claim 27, wherein the mobile communicator is a mobile telephone.

39. A vehicle navigation apparatus comprising:
a mobile communicator situated in a vehicle;
a decoder situated in a vehicle, the decoder electrically coupled to communication with the mobile communicator; and
a vehicle navigation device situated in the vehicle, the navigation device electrically coupled to the decoder; wherein a voice portal server is able to communicate to the navigation device via a base station and the mobile telephone over a voice channel.

40. The apparatus of claim 39, wherein the decoder is a DTMF decoder.

41. The apparatus of claim 40, wherein:
an occupant of the vehicle is able to communicate a requested location via the mobile telephone and the base station to the voice portal server; and
the voice portal server is able to recognize the requested location and create a set of at least one possible destination location.

42. The apparatus of claim 41, wherein:
the at least one possible destination location is at least two possible destination locations;
the voice portal server is able to prompt the occupant with at least one interrogatory; and
the at least one interrogatory is able to be designed to reduce the set of at least two possible destination locations to a single destination location.

43. The apparatus of claim 42, wherein the voice portal server is able to communicate the destination location in a DTMF encoded format to the decoder via the base station and mobile telephone.

44. The apparatus of claim 43, wherein the decoder is able to decode the destination location and communicates the destination location to the navigation device.

45. The apparatus of claim 44, wherein the navigation device is able to use at least one of the current location, the destination location, and a stored set of possible routes to calculate a selected route and then is able to communicate the selected route to the occupant by at least one of a visual display unit and at least one audible direction.

* * * * *